United States Patent
Scott et al.

(10) Patent No.: US 9,962,788 B2
(45) Date of Patent: May 8, 2018

(54) SUB-SURFACE MARKING OF PRODUCT HOUSINGS

(71) Applicant: Apple Inc., Cupertino, CA (US)

(72) Inventors: Matthew S. Scott, San Francisco, CA (US); Michael Nashner, San Jose, CA (US)

(73) Assignee: APPLE INC., Cupertino, CA (US)

( * ) Notice: Subject to any disclaimer, the term of this patent is extended or adjusted under 35 U.S.C. 154(b) by 824 days.

(21) Appl. No.: 14/444,842

(22) Filed: Jul. 28, 2014

(65) Prior Publication Data

US 2014/0332435 A1 Nov. 13, 2014

Related U.S. Application Data

(60) Division of application No. 12/895,814, filed on Sep. 30, 2010, now Pat. No. 8,809,733, which is a (Continued)

(51) Int. Cl.
*B23K 26/00* (2014.01)
*G09F 3/02* (2006.01)
(Continued)

(52) U.S. Cl.
CPC ...... *B23K 26/0057* (2013.01); *B23K 26/0006* (2013.01); *B41M 5/262* (2013.01);
(Continued)

(58) Field of Classification Search
CPC .. B23K 26/006; B23K 26/0057; B41M 5/262; B41M 5/24; B41J 2/442; B44B 7/002; B44C 1/005; C25D 11/18
See application file for complete search history.

(56) References Cited

U.S. PATENT DOCUMENTS

| 2,647,079 A | 7/1953 | Burnham |
| 2,812,295 A | 11/1957 | Patrick |

(Continued)

FOREIGN PATENT DOCUMENTS

| CN | 1362125 A | 8/2002 |
| CN | 1306526 C | 3/2007 |

(Continued)

OTHER PUBLICATIONS

Gaillard et al., "Characterization of Anodic Oxides on 304L Stainless Steel surfaces", Feb. 1987 John Wiley & Sons Ltd. Surface and Interface Analysis vol. 10, pp. 163-167.*

(Continued)

*Primary Examiner* — Geoffrey S Evans

(74) *Attorney, Agent, or Firm* — Brownstein Hyatt Farber Schreck, LLP

(57) ABSTRACT

Techniques or processes for providing markings on products are disclosed. In one embodiment, the products have housings and the markings are to be provided on sub-surfaces of the housings. For example, a housing for a particular product can include an outer housing surface and the markings can be provided on a sub-surface the outer housing surface yet still be visible from the outside of the housing. Since the markings are beneath the surface of the housing, the markings are durable.

17 Claims, 17 Drawing Sheets

Related U.S. Application Data continuation-in-part of application No. 12/643,772, filed on Dec. 21, 2009.

(60) Provisional application No. 61/252,623, filed on Oct. 16, 2009, provisional application No. 61/378,913, filed on Aug. 31, 2010.

(51) Int. Cl.
    *B41M 5/26*     (2006.01)
    *B23K 103/00*     (2006.01)

(52) U.S. Cl.
    CPC ............ *G09F 3/02* (2013.01); *B23K 2203/50* (2015.10); *G09F 2003/0208* (2013.01)

(56) References Cited

U.S. PATENT DOCUMENTS

| | | | |
|---|---|---|---|
| 2,990,304 A | 6/1961 | Cybriwsky et al. | |
| 3,080,270 A | 3/1963 | Fritz | |
| 3,316,866 A | 5/1967 | Shelton | |
| 3,526,694 A | 9/1970 | Lemelson | |
| 3,615,432 A | 10/1971 | Jenkins et al. | |
| 3,645,777 A | 2/1972 | Sierad | |
| RE28,225 E | 11/1974 | Heseltine et al. | |
| 4,247,600 A | 1/1981 | Adachi et al. | |
| 4,269,947 A | 5/1981 | Inata et al. | |
| 4,347,428 A | 8/1982 | Conrad et al. | |
| 4,531,705 A | 7/1985 | Nakagawa et al. | |
| 4,547,649 A | 10/1985 | Butt et al. | |
| 4,564,001 A | 1/1986 | Maeda | |
| 4,651,453 A | 3/1987 | Doyle | |
| 4,686,352 A | 8/1987 | Nawrot et al. | |
| 4,756,771 A | 7/1988 | Brodalla et al. | |
| 4,931,366 A | 6/1990 | Mullaney | |
| 4,993,148 A | 2/1991 | Adachi et al. | |
| 5,202,013 A | 4/1993 | Chamberlain | |
| 5,215,864 A | 6/1993 | Laakmann | |
| 5,224,197 A | 6/1993 | Zanoni et al. | |
| 5,288,344 A | 2/1994 | Peker et al. | |
| 5,417,905 A | 5/1995 | Lemaire et al. | |
| 5,645,964 A | 7/1997 | Nohr et al. | |
| 5,719,379 A | 2/1998 | Huang et al. | |
| 5,744,270 A | 4/1998 | Pearlman et al. | |
| 5,789,466 A | 8/1998 | Birmingham et al. | |
| 5,808,268 A | 9/1998 | Balz | |
| 5,837,086 A | 11/1998 | Leeb et al. | |
| 5,872,699 A | 2/1999 | Nishii et al. | |
| 5,925,847 A | 7/1999 | Rademacher et al. | |
| 5,943,799 A | 8/1999 | Xu et al. | |
| 6,007,929 A | 12/1999 | Robertson et al. | |
| 6,101,372 A | 8/2000 | Kubo | |
| 6,169,266 B1 | 1/2001 | Hughes | |
| 6,325,868 B1 | 12/2001 | Kim et al. | |
| 6,331,239 B1 | 12/2001 | Shirota et al. | |
| 6,480,397 B1 | 11/2002 | Hsu et al. | |
| 6,540,667 B2 | 4/2003 | Cochran | |
| 6,574,096 B1 | 6/2003 | Difonzo et al. | |
| 6,590,183 B1 | 7/2003 | Yeo | |
| 6,633,019 B1 | 10/2003 | Gray | |
| 6,746,724 B1 | 6/2004 | Robertson et al. | |
| 6,802,952 B2 | 10/2004 | Hsu et al. | |
| 6,821,305 B2 | 11/2004 | Yan | |
| 6,966,133 B2 | 11/2005 | Krings et al. | |
| 6,996,425 B2 | 2/2006 | Watanabe | |
| 7,065,820 B2 | 6/2006 | Meschter | |
| 7,134,198 B2 | 11/2006 | Nakatani et al. | |
| 7,181,172 B2 | 2/2007 | Sullivan et al. | |
| 7,225,529 B2 | 6/2007 | Wang | |
| 7,284,396 B2 | 10/2007 | Barron et al. | |
| 7,459,373 B2 | 12/2008 | Yoo | |
| 7,508,644 B2 | 3/2009 | Cheung et al. | |
| 7,622,183 B2 | 11/2009 | Shirai et al. | |
| 7,636,974 B2 | 12/2009 | Meschter et al. | |
| 7,691,189 B2 | 4/2010 | En et al. | |
| 7,947,900 B2 * | 5/2011 | Cheng | B32B 15/01 174/50 |
| 8,192,815 B2 | 6/2012 | Weber et al. | |
| 8,367,304 B2 | 2/2013 | Heley et al. | |
| 8,379,678 B2 | 2/2013 | Zhang et al. | |
| 8,379,679 B2 | 2/2013 | Zhang et al. | |
| 8,451,873 B2 | 5/2013 | Zhang | |
| 8,663,806 B2 | 3/2014 | Weber et al. | |
| 8,761,216 B2 | 6/2014 | Zhang | |
| 8,809,733 B2 | 8/2014 | Scott et al. | |
| 8,842,351 B2 | 9/2014 | Lawrence et al. | |
| 8,879,266 B2 | 11/2014 | Jarvis et al. | |
| 8,893,975 B2 | 11/2014 | Sanford et al. | |
| 8,993,921 B2 | 3/2015 | Browning et al. | |
| 9,034,166 B2 | 5/2015 | Tatebe et al. | |
| 9,089,932 B2 | 7/2015 | Lim | |
| 9,132,510 B2 | 9/2015 | Nashner et al. | |
| 9,133,559 B2 | 9/2015 | Silverman | |
| 9,138,826 B2 | 9/2015 | Harrison | |
| 9,173,336 B2 | 10/2015 | Bhatia | |
| 9,185,835 B2 | 11/2015 | Heley et al. | |
| 9,314,871 B2 | 4/2016 | Nashner et al. | |
| 2001/0030002 A1 | 10/2001 | Zheng et al. | |
| 2002/0058737 A1 | 5/2002 | Nishiwaki et al. | |
| 2002/0097440 A1 | 7/2002 | Paricio et al. | |
| 2002/0109134 A1 | 8/2002 | Iwasaki et al. | |
| 2002/0130441 A1 | 9/2002 | Robinson et al. | |
| 2002/0160145 A1 | 10/2002 | Bauhoff | |
| 2003/0006217 A1 | 1/2003 | Dance | |
| 2003/0024898 A1 | 2/2003 | Natsume et al. | |
| 2003/0074814 A1 | 4/2003 | Krings et al. | |
| 2003/0201259 A1 * | 10/2003 | Yeo | B41M 5/262 219/121.69 |
| 2003/0225189 A1 | 12/2003 | Fuller | |
| 2004/0000490 A1 | 1/2004 | Chang | |
| 2004/0149986 A1 * | 8/2004 | Dubowski | H01L 21/268 257/40 |
| 2005/0023022 A1 | 2/2005 | Kriege et al. | |
| 2005/0034301 A1 | 2/2005 | Wang | |
| 2005/0115840 A1 | 6/2005 | Dolan | |
| 2005/0127123 A1 * | 6/2005 | Smithers | A45F 5/00 224/610 |
| 2005/0158576 A1 | 7/2005 | Groll | |
| 2005/0263418 A1 | 12/2005 | Bastus Cortes | |
| 2006/0007524 A1 | 1/2006 | Tam | |
| 2006/0055084 A1 | 3/2006 | Yamaguchi et al. | |
| 2006/0066771 A1 | 3/2006 | Hayano et al. | |
| 2006/0105542 A1 | 5/2006 | Yoo | |
| 2006/0225918 A1 | 10/2006 | Chinda et al. | |
| 2007/0018817 A1 | 1/2007 | Marmaropoulos et al. | |
| 2007/0045893 A1 | 3/2007 | Asthana et al. | |
| 2007/0053504 A1 | 3/2007 | Sato et al. | |
| 2007/0262062 A1 | 11/2007 | Guth | |
| 2007/0275263 A1 | 11/2007 | Groll | |
| 2008/0152859 A1 | 6/2008 | Nagal | |
| 2008/0160295 A1 * | 7/2008 | Lappalainen | B23K 26/0648 428/332 |
| 2008/0165485 A1 | 7/2008 | Zadesky et al. | |
| 2008/0166007 A1 | 7/2008 | Hankey | |
| 2008/0241478 A1 | 10/2008 | Costin et al. | |
| 2008/0274375 A1 * | 11/2008 | Ng | C25D 11/08 428/687 |
| 2008/0295263 A1 | 12/2008 | Meschter et al. | |
| 2008/0299408 A1 | 12/2008 | Guo et al. | |
| 2008/0311369 A1 | 12/2008 | Yokoyama et al. | |
| 2009/0017242 A1 | 1/2009 | Weber et al. | |
| 2009/0019737 A1 | 1/2009 | Moreno | |
| 2009/0047505 A1 * | 2/2009 | Liu | C25D 11/04 428/332 |
| 2009/0091879 A1 | 4/2009 | Lim | |
| 2009/0104949 A1 | 4/2009 | Sato et al. | |
| 2009/0136723 A1 | 5/2009 | Zhao | |
| 2009/0190290 A1 | 7/2009 | Lynch et al. | |
| 2009/0194308 A1 * | 8/2009 | Cheng | B32B 15/01 174/50 |
| 2009/0194444 A1 | 8/2009 | Jones | |
| 2009/0197116 A1 * | 8/2009 | Cheng | B32B 15/01 428/651 |

(56) References Cited

U.S. PATENT DOCUMENTS

| | | |
|---|---|---|
| 2009/0236143 A1 | 9/2009 | Nakamura |
| 2009/0260871 A1 | 10/2009 | Weber et al. |
| 2009/0262079 A1* | 10/2009 | Bury .................. G06F 1/162 345/169 |
| 2009/0298299 A1* | 12/2009 | Cain .................. H01L 51/0023 438/795 |
| 2009/0305168 A1 | 12/2009 | Heley et al. |
| 2010/0015578 A1 | 1/2010 | Falsafi et al. |
| 2010/0061039 A1 | 3/2010 | Sanford et al. |
| 2010/0065313 A1 | 3/2010 | Takeuchi et al. |
| 2010/0159273 A1 | 6/2010 | Filson et al. |
| 2010/0183869 A1 | 7/2010 | Lin et al. |
| 2010/0209721 A1 | 8/2010 | Irikura et al. |
| 2010/0209731 A1 | 8/2010 | Hamano |
| 2010/0294426 A1 | 11/2010 | Nashner |
| 2010/0300909 A1 | 12/2010 | Hung |
| 2011/0008618 A1 | 1/2011 | Weedlun |
| 2011/0048755 A1 | 3/2011 | Su et al. |
| 2011/0051337 A1 | 3/2011 | Weber et al. |
| 2011/0089039 A1 | 4/2011 | Nashner et al. |
| 2011/0089067 A1 | 4/2011 | Scott et al. |
| 2011/0123737 A1 | 5/2011 | Nashner et al. |
| 2011/0186455 A1 | 8/2011 | Du et al. |
| 2011/0193928 A1 | 8/2011 | Zhang et al. |
| 2011/0193929 A1 | 8/2011 | Zhang et al. |
| 2011/0194574 A1 | 8/2011 | Zhang et al. |
| 2011/0253411 A1 | 10/2011 | Hum et al. |
| 2011/0315667 A1 | 12/2011 | Reichenback et al. |
| 2012/0043306 A1 | 2/2012 | Howerton et al. |
| 2012/0081830 A1 | 4/2012 | Yeates et al. |
| 2012/0100348 A1 | 4/2012 | Brokhyser et al. |
| 2012/0248001 A1 | 10/2012 | Nashner |
| 2012/0275130 A1 | 11/2012 | Hsu et al. |
| 2013/0075126 A1 | 3/2013 | Nashner et al. |
| 2013/0083500 A1 | 4/2013 | Prest et al. |
| 2013/0129986 A1 | 5/2013 | Heley et al. |
| 2014/0009873 A1 | 1/2014 | Nashner |
| 2014/0134429 A1 | 5/2014 | Weber et al. |
| 2014/0186654 A1 | 7/2014 | Zhang |
| 2014/0363608 A1 | 12/2014 | Russell-Clarke et al. |
| 2014/0367369 A1 | 12/2014 | Nashner et al. |
| 2014/0370325 A1 | 12/2014 | Nashner et al. |
| 2015/0093563 A1 | 4/2015 | Runge et al. |
| 2015/0132541 A1 | 5/2015 | McDonald et al. |
| 2015/0176146 A1 | 6/2015 | Browning et al. |

FOREIGN PATENT DOCUMENTS

| | | |
|---|---|---|
| CN | 201044438 Y | 2/2008 |
| CN | 101204866 | 6/2008 |
| CN | 102173242 A | 9/2011 |
| DE | 195 23 112 | 6/1996 |
| DE | 102005048870 A1 | 4/2007 |
| EP | 0031463 | 7/1981 |
| EP | 0 114 565 A1 | 8/1984 |
| EP | 121150 A1 | 10/1984 |
| EP | 0234121 | 9/1987 |
| EP | 0 633 585 A | 1/1995 |
| EP | 0 997 958 A1 | 5/2000 |
| EP | 2 399 740 A1 | 12/2011 |
| EP | 2488369 B1 | 3/2014 |
| GB | 788 329 A | 12/1957 |
| JP | 57-149491 A | 9/1982 |
| JP | 03 013331 A | 1/1991 |
| JP | 03 138131 A | 6/1991 |
| JP | 3-203694 A | 9/1991 |
| JP | 06-126192 | 5/1994 |
| JP | A H06-212451 | 8/1994 |
| JP | 06-320104 | 11/1994 |
| JP | 7-204871 A | 8/1995 |
| JP | 2000-000167 | 1/2000 |
| JP | 2002/370457 | 12/2002 |
| JP | 2003055794 | 2/2003 |
| JP | 2005/22924 | 1/2005 |
| JP | A2006-138002 | 6/2006 |
| JP | 2007-311044 A * | 11/2007 |
| JP | 2008 087409 A | 4/2008 |
| WO | WO 98/53451 | 11/1998 |
| WO | WO 0077883 | 12/2000 |
| WO | WO 01/15916 A1 | 3/2001 |
| WO | WO 01/34408 | 5/2001 |
| WO | WO 2006/124279 A2 | 11/2006 |
| WO | WO 2007/088233 A1 | 8/2007 |
| WO | WO 2008/092949 A1 | 8/2008 |
| WO | WO 2009/051218 A1 | 4/2009 |
| WO | WO 2010/095747 A1 | 8/2010 |
| WO | WO 2010/111798 A1 | 10/2010 |
| WO | WO 2010/135415 | 11/2010 |
| WO | WO2010/135415 A2 | 11/2010 |
| WO | WO 2011/047325 A1 | 4/2011 |

OTHER PUBLICATIONS

"Thermal Shock Resistant Conformal Coating", Product Data Sheet, Dymax Corporation, Jul. 9, 2007, pp. 1-2.

"Marking Lasers: Marking without Limitations", Trumpf Inc., Sep. 10, 2007, pp. 1-36.

"UV-Curing Sheet Adhesives", ThreeBond Technical News, Issued Jul. 1, 2009, 8 pages.

Chang, "Lasers Make Other Metals Look Like Gold", New York Times, nytimes.com, 2 pgs., Jan. 31, 2008.

"Database EPI" Week 201107 Thomas Scientific, London, GB; AN 2010-Q46184, Nov. 17, 2010, 1 pg.

"DP2UV Basick System 2 W", ROBA Technology + Services GmbH, Aug. 2008, 2 pgs.

Zhao et al., Anodizing Behavior of aluminum foil Patterned with SiO2 Mask, Aug. 2005, Journal of Electrochemical Society, vol. 152 (10), pp. B411-B414.

* cited by examiner

| Laser Model | FOBA DP20GS | SPI 12W/SM | SPI 20W/SM | Lumera |
|---|---|---|---|---|
| Laser Type | DPSS YVO4 | Fiber | Fiber | Picosecond |
| Average Power in Watts | 18.4 | 9 | 18 | 2.5 |
| Wavelength in Nanometers | 1064 | 1062 | 1062 | 1064 |
| Pulse Width in Nanoseconds | 20 | 10 to 50 | 12 | 0.015 |
| Frequency in Kilohertz | 40 | 100 to 240 | 400 | 500 |
| Pulse Energy in milliJoules | 0.46 | 0.04 to 0.09 | 0.045 | 0.005 |
| Peak Power in Kilowatts | 23 | 0.75 to 9 | 3.75 | 333 |
| Spot Diameter (1/e^2) in microns | 250 | 80 | 80 | 80 |
| Fluence in Joules per square centimeter | 0.94 | 0.08 to 1.80 | 0.90 | 0.10 |
| Irradiance in Gigawatts per square centimeter | 0.05 | 0.01 to 0.18 | 0.003 | 6.63 |
| Line Spacing in microns | 10 | 5 to 20 | 3 | 20 |
| Scan Speed in millimeters per second | 20 | 20 | 20 | 20 |

FIG. 4D

SUB-SURFACE MARKING OF PRODUCT HOUSINGS

CROSS-REFERENCE TO RELATED APPLICATIONS

This application is a divisional of U.S. application Ser. No. 12/895,814, filed Sep. 30, 2010, now U.S. Pat. No. 8,809,733 and entitled "SUB-SURFACE MARKING OF PRODUCT HOUSINGS," which is hereby incorporated herein by reference, which is a continuation-in-part of U.S. application Ser. No. 12/643,772, filed Dec. 21, 2009, now U.S. Pat. No. 9,845,546 and entitled "SUB-SURFACE MARKING OF PRODUCT HOUSINGS," which is hereby incorporated herein by reference, which claims priority benefit of U.S. Provisional Application No. 61/252,623, filed Oct. 16, 2009 and entitled "SUB-SURFACE MARKING OF PRODUCT HOUSINGS," which is hereby incorporated herein by reference.

The parent application, U.S. application Ser. No. 12/895,814, also claims priority benefit of: (i) U.S. Provisional Application No. 61/252,623, filed Oct. 16, 2009 and entitled "SUB-SURFACE MARKING OF PRODUCT HOUSINGS," which is hereby incorporated herein by reference; and (ii) U.S. Provisional Application No. 61/378,913, filed Aug. 31, 2010 and entitled "SUB-SURFACE MARKING OF PRODUCT HOUSINGS," which is hereby incorporated herein by reference.

BACKGROUND OF THE INVENTION

Field of the Invention

The present invention relates to marking products and, more particularly, marking outer housing surfaces of electronic devices.

Description of the Related Art

Consumer products, such as electronic devices, have been marked with different information for many years. For example, it is common for electronic devices to be marked with a serial number, model number, copyright information and the like. Conventionally, such marking is done with an ink printing or stamping process. Although conventional ink printing and stamping is useful for many situations, such techniques can be inadequate in the case of handheld electronic devices. The small form factor of handheld electronic devices, such as mobile phones, portable media players and Personal Digital Assistants (PDAs), requires that the marking be very small. In order for such small marking to be legible, the marking must be accurately and precisely formed. Unfortunately, however, conventional techniques are not able to offer sufficient accuracy and precision. Thus, there is a need for improved techniques to mark products.

SUMMARY OF THE INVENTION

The invention pertains to techniques or processes for providing markings on products. In one embodiment, the products have housings and the markings are to be provided on sub-surfaces of the housings. For example, a housing for a particular product can include an outer housing surface and the markings can be provided on a sub-surface the outer housing surface yet still be visible from the outside of the housing. Since the markings are beneath the surface of the housing, the markings are durable. The markings provided on products can be textual and/or graphic. The markings can be formed with high resolution. The markings are also able to be dark, even on metal surfaces.

In general, the markings (also referred to as annotations or labeling) provided on products according to the invention can be textual and/or graphic. The markings can be used to provide a product (e.g., a product's housing) with certain information. The marking can, for example, be use to label the product with various information. When a marking includes text, the text can provide information concerning the product (e.g., electronic device). For example, the text can include one or more of: name of product, trademark or copyright information, design location, assembly location, model number, serial number, license number, agency approvals, standards compliance, electronic codes, memory of device, and the like). When a marking includes a graphic, the graphic can pertain to a logo, a certification mark, standards mark or an approval mark that is often associated with the product. The marking can be used for advertisements to be provided on products. The markings can also be used for customization (e.g., user customization) of a housing of a product.

The invention can be implemented in numerous ways, including as a method, system, device, or apparatus. Several embodiments of the invention are discussed below.

As a method for marking an article, one embodiment can, for example, include at least providing a metal structure for the article, anodizing at least a first surface of the metal structure; and subsequently altering surface characteristics of selective portions of an inner unanodized surface of the metal structure. In one embodiment, the altering of the surface characteristics can be performed by directing a laser output through the anodized first surface of the metal structure towards the inner unanodized surface of the metal structure.

As a method for marking an article, another embodiment can, for example, include at least providing a metal structure for the article, anodizing at least a first surface of the metal structure, so as to provide an outer anodized surface of the metal structure and an inner unanodized surface of the metal structure, altering surface characteristics of selective portions of an inner unanodized surface of the metal structure, and treating the outer anodized surface of the metal structure.

As an electronic device housing, one embodiment of the invention can, for example, include at least a housing structure that includes at least an outer portion and an inner portion. The outer portion is anodized and the inner portion is unanodized. In addition, to provide predetermined marking of the electronic device housing, a surface of the inner portion adjacent the outer portion has selectively altered surface regions.

As a housing arrangement, one embodiment of the invention can, for example, include a base metal layer, an additional layer, and sub-surface marking indicia. The additional layer has a first bonding surface and a first exterior surface. The first bonding surface is bonded to a first surface of the base metal layer, and the first exterior surface serves as an exterior of the housing arrangement. The sub-surface marking indicia are formed on the first surface of the base metal layer.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which:

FIG. 4D is a table illustrating exemplary laser operation parameters for marking the metal structure according to one embodiment.

DETAILED DESCRIPTION OF EMBODIMENTS OF THE INVENTION

The invention pertains to techniques or processes for providing markings on products. In one embodiment, the products have housings and the markings are to be provided on sub-surfaces of the housings. For example, a housing for a particular product can include an outer housing surface and the markings can be provided on a sub-surface the outer housing surface yet still be visible from the outside of the housing. Since the markings are beneath the surface of the housing, the markings are durable. The markings provided on products can be textual and/or graphic. The markings can be formed with high resolution. The markings are also able to be dark, even on metal surfaces.

In general, the markings (also referred to as annotations or labeling) provided on products according to the invention can be textual and/or graphic. The markings can be used to provide a product (e.g., a product's housing) with certain information. The marking can, for example, be use to label the product with various information. When a marking includes text, the text can provide information concerning the product (e.g., electronic device). For example, the text can include one or more of: name of product, trademark or copyright information, design location, assembly location, model number, serial number, license number, agency approvals, standards compliance, electronic codes, memory of device, and the like). When a marking includes a graphic, the graphic can pertain to a logo, a certification mark, standards mark or an approval mark that is often associated with the product. The marking can be used for advertisements to be provided on products. The markings can also be used for customization (e.g., user customization) of a housing of a product.

Exemplary embodiments of the invention are discussed below with reference to FIGS. 1-11. However, those skilled in the art will readily appreciate that the detailed description given herein with respect to these figures is for explanatory purposes as the invention extends beyond these limited embodiments.

Figure 1:
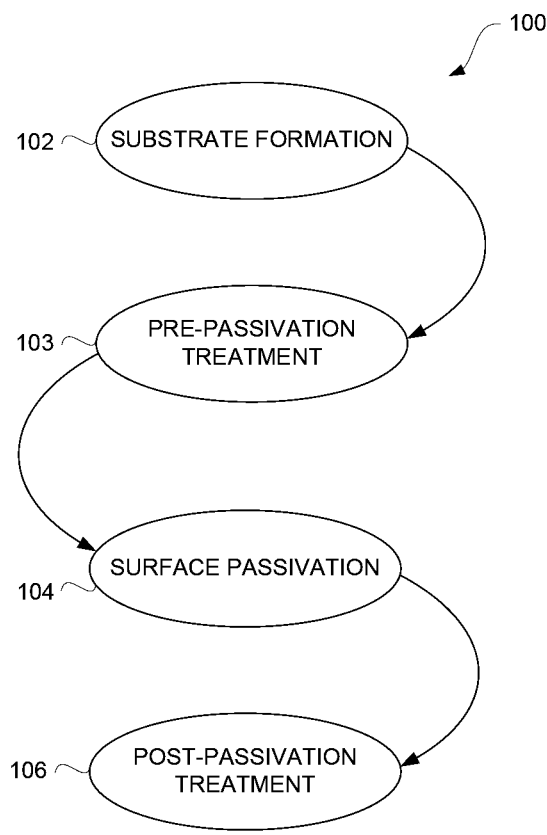
FIG. 1 is a diagram of a marking state machine according to one embodiment of the invention.

FIG. 1 is a diagram of a marking state machine 100 according to one embodiment of the invention. The marking state machine 100 reflects three (3) basic states associated with marking an electronic device. Specifically, the marking can mark a housing of an electronic device, such as a portable electronic device.

The marking state machine 100 includes a substrate formation state 102. At the substrate formation state 102, a substrate can be obtained or produced. For example, the substrate can represent at least a portion of a housing surface of an electronic device. Next, the marking state machine 100 can transition to a pre-passivation treatment state. Pre-passivation treatment may comprise texturing or polishing the substrate.

Next, the marking state machine 100 can transition to a surface passivation state 104. At the surface passivation state 104, a protective surface can be formed or applied to at least one surface of the substrate. The protective surface can be used to protect the surface of the substrate. For example, the protective surface can be a more durable surface than that of the surface. Next, the marking state machine 100 can transition to a post-passivation treatment state 106. The post-passivation treatment state 106, may comprise marking, which may be produced on a sub-surface of the substrate (subsurface marking). In particular, the sub-surface marking may be performed on the substrate below the protective surface. The protective surface is typically substantially translucent to allow the sub-surface marking to be visible through the protective surface. The marking may be provided with high resolution and can be protected. Since the marking is provided on a sub-surface, the marking is not only protected but also has the cosmetic advantage of not being perceptible of tactile detection on the surface.

Figure 2:
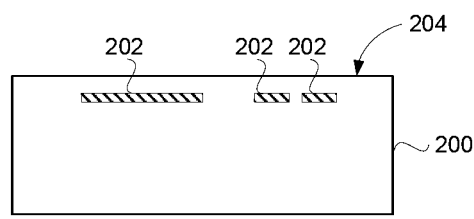
FIG. 2 is an illustration of a substrate having sub-surface alterations 202 according to one embodiment.

FIG. 2 is an illustration of a substrate 200 having sub-surface alterations 202 according to one embodiment. The sub-surface alterations 202 are provided below an outer surface 204 of the substrate 200. Given that the outer surface 204 is typically substantially translucent (e.g., clear), the sub-surface alterations 202 are visible by a user through the outer surface 204. Accordingly, the sub-surface alterations 202 can provide markings on the substrate 200. Since the markings are provided by the sub-surface alterations 202, the markings are protected by the outer surface 204.

The substrate 200 can represent at least a portion of a housing of an electronic device. The marking being provided to the substrate can provide text and/or graphics to an outer housing surface of a portable electronic device. The marking techniques are particularly useful for smaller scale portable electronic devices, such as handheld electronic devices. Examples of handheld electronic devices include mobile telephones (e.g., cell phones), Personal Digital Assistants (PDAs), portable media players, remote controllers, pointing devices (e.g., computer mouse), game controllers, etc.

The marking is, in one embodiment, particularly well-suited for applying text and/or graphics to a housing of an electronic device. As noted above, the substrate can represent a portion of a housing of an electronic device. Examples of electronic devices, namely, handheld electronic devices, include mobile telephones (e.g., cell phones), Personal Digital Assistants (PDAs), portable media players, remote controllers, pointing devices (e.g., computer mouse), game controllers, etc.

Figure 3A:
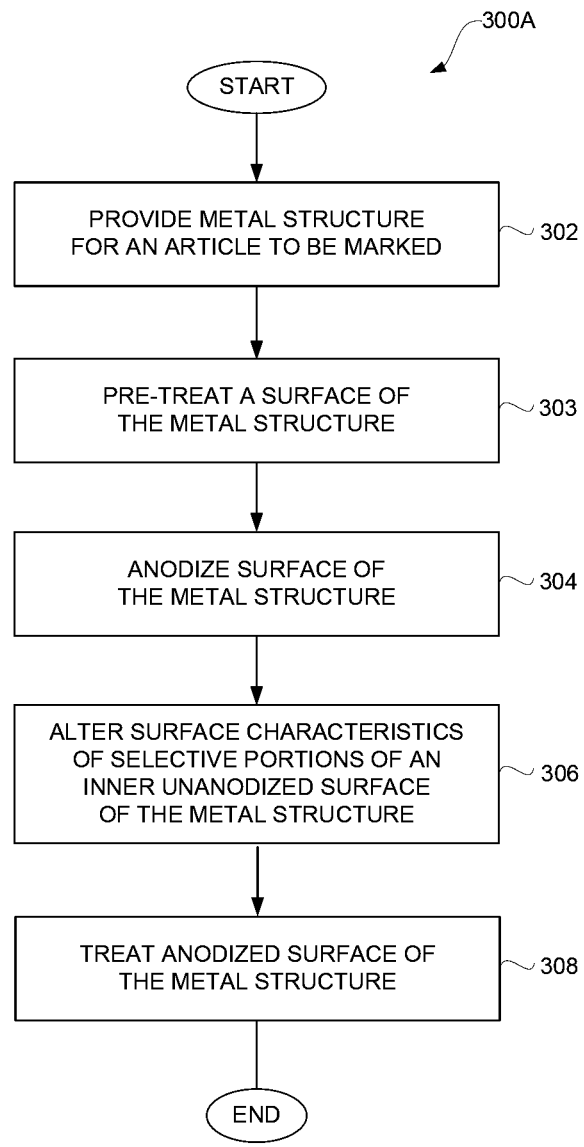
FIGS. 3A and 3B are flow diagrams of a marking process according to various embodiments.
Figure 3B:
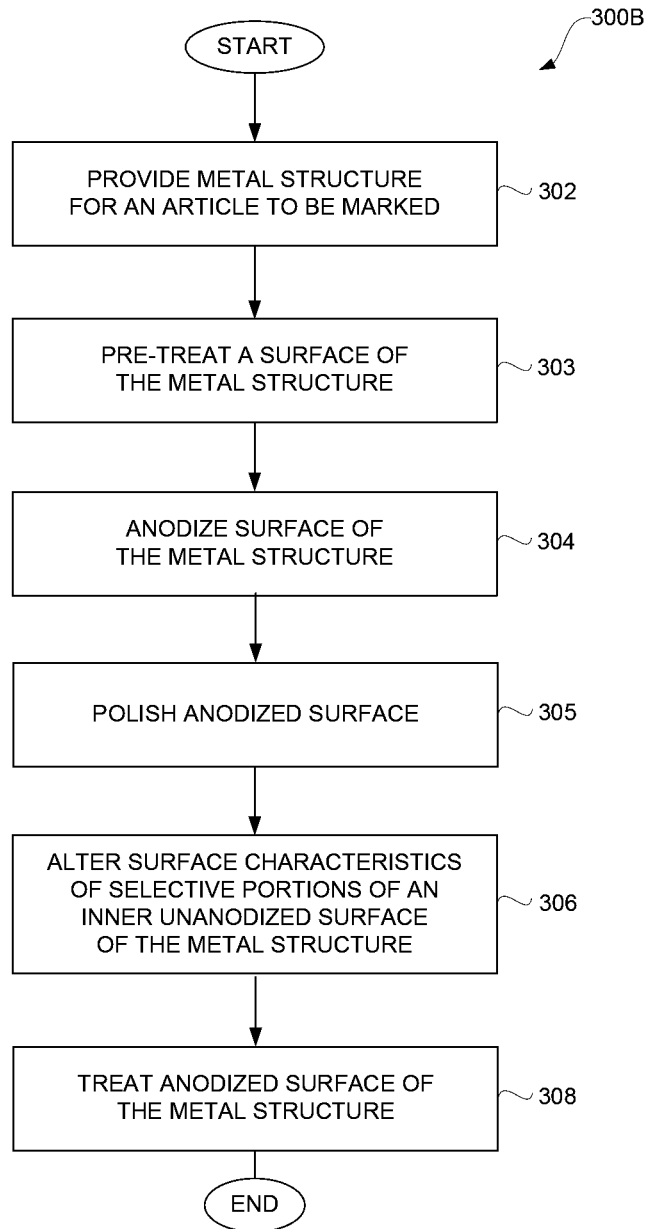

FIGS. 3A and 3B are flow diagrams of a marking process according to various embodiments 300A, 300B. FIGS. 3A and 3B show marking process embodiments 300A, 300B, which can be performed on an electronic device that is to be marked. The marking process embodiments 300A, 300B are, for example, suitable for applying text or graphics to a housing (e.g., an outer housing surface) of an electronic device. The marking can be provided such that it is visible to users of the electronic device. However, the marking can be placed in various different positions, surfaces or structures of the electronic device.

FIG. 3A shows marking process 300A which may provide 302 a metal structure for an article to be marked. The metal structure can pertain to a metal housing for an electronic device, such as a portable electronic device, to be marked. The metal structure can be formed of one metal layer. The metal structure can also be formed of multiple layers of different materials, where at least one of the multiple layers is a metal layer. The metal layer may, for example, be or include aluminum, titanium, niobium or tantalum.

After the metal structure has been provided 302, a surface of the metal structure may be pre-treated 303. Pre-treating may comprise polishing and/or texturing the surface of the metal structure. In particular, polishing may be accomplished through buffing, which may make the surface of the metal structure smooth, flat, shiny or mirror-like. Buffing may be accomplished with a buffing wheel either manually or in an automated process by a robot, or combinations therein. The buffing wheel may be a cloth wheel and may be covered in an oil or wax having abrasive particles mixed or suspended therein. In order to obtain a smooth, flat, shiny, or mirror-like surface it may be necessary to go through several buffing stages. Each buffing stage may have a different cloth material for the buffing wheel and a different wax or oil with different abrasive particles applied thereto to provide a different surface texture to the buffing wheel, and therefore a different amount of abrasion to surface of the metal structure. The amount of pressure and duration of the buffing for each buffing wheel may also vary.

For example in a first buffing stage, the surface of the metal structure may be buffed for about seventeen (17) seconds with a pleated sisal wheel coated with an oil having coarse aluminum oxide particles suspended therein. In a second buffing stage, the surface of the metal structure may be buffed in a cross direction from the buffing of the first buffing stage for about seventeen (17) seconds with a pleated sisal wheel coated with an oil having coarse aluminum oxide particles suspended therein. In a third buffing stage, the surface of the metal structure may be buffed for about seventeen (17) seconds with a pleated sisal wheel coated with an oil having coarse aluminum oxide particles suspended therein. In a fourth buffing stage, the surface of the metal structure may be buffed for about seventeen (17) seconds with a pleated sisal wheel coated with an oil having coarse aluminum oxide particles suspended therein. In a fifth buffing stage, the surface of the metal structure may be buffed for about seventeen (17) seconds with an un-reinforced cotton wheel coated with an oil having finer aluminum oxide particles suspended therein than the coarse aluminum oxide particles utilized in the first through fourth buffing stages. In a sixth buffing stage, the surface of the metal structure may be buffed for about seventeen (17) seconds with a flannel wheel coated with an oil having finer aluminum oxide particles suspended therein than the coarse aluminum oxide particles utilized in the first through fourth buffing stages. The type of abrasive particles, the size of the abrasive particles, the duration of the buffing stage, and the material of the wheel described above for each buffing stage, as well as the number of buffing stages, are merely exemplary and may be varied.

Polishing may result in a high quality surface of the metal structure with no orange peel, no waviness, and no defects. All die lines, stamping marks, drawing marks, shock lines, cutter marks, roughness, waviness, and/or oil and grease may be removed from the surface of the metal structure during polishing. Buffing is merely an exemplary method for accomplishing the polishing and other polishing methods may be utilized that would result in turning rough and bumpy the surface of the metal structure into a smooth, flat, shiny, or mirror-like surface and may achieve the foregoing results.

Texturing the surface of the metal structure may comprise etching the surface of the metal structure. In particular, texturing may include a chemical process such as etching the surface of the metal structure with an alkaline etching solution. The alkaline etching solution may be a sodium hydroxide (NaOH) solution. The concentration of the NaOH solution may range between about 50 and 60 g/l, 51 and 59 g/l, 52 and 58 g/l, 53 and 57 g/l, or 54 and 56 g/l, or may be about 55 g/l. The NaOH solution may have a temperature of about 50 degrees Celsius. The surface of the metal structure may be exposed to the NaOH solution for a time period that may range between about 5 and 30 seconds, about 10 and 25 seconds, or about 15 and 20 seconds. These parameters are merely exemplary and may be varied. Sodium hydroxide is merely an exemplary alkaline etching solution and other alkaline etching solutions may be utilized, including, but not limited to ammonium bifluoride ($NH_4F_2$).

Further, texturing may comprise abrasive blasting, wherein a stream of abrasive material may be forcibly propelled against the surface of the metal structure. For example, texturing may comprise sandblasting, wherein a stream of sand may be forcibly propelled against the surface of the metal structure. As another example, texturing may comprise bead blasting, wherein a stream of fine glass beads, or other bead material, or bead material compound, may be forcibly propelled against the surface of the metal structure.

In the pre-treating 303 of the surface of the metal structure shown in FIG. 3A, polishing as discussed previously may be combined with texturing as just discussed. Accordingly, the surface of the metal structure may be polished by buffing to provide the high quality or mirror like appearance, prior to texturing.

Further, polishing the surface of the metal structure may comprise chemical polishing. In particular, in the pre-treating 303 of the surface of the metal structure shown in FIG. 3A, texturing (or texturing after buffing) as discussed previously may be combined with chemical polishing. Accordingly, a textured surface of the metal structure may be chemically polished after texturing, to increase gloss of the textured surface.

Chemical polishing may employ a chemical polishing solution, which may be an acidic solution. Acids that may be included in the solution include, but are not limited to, phosphoric acid ($H_3PO_4$), nitric acid ($HNO_3$), sulfuric acid ($H_2SO_4$), and combinations thereof. The acid may be phosphoric acid, a combination of phosphoric acid and nitric acid, a combination of phosphoric acid and sulfuric acid, or a combination of phosphoric acid, nitric acid and sulfuric acid. Other additives for the chemical polishing solution may include copper sulfate ($CuSO_4$) and water. In one embodiment, a solution of 85% phosphoric acid is utilized that is maintained at a temperature of 95 degrees Celsius. The processing time may be adjusted depending upon a desired target gloss value. In one embodiment, the processing time may be in a range between about 40 and 60 seconds. In addition, polishing after texturing of the surface of the metal structure may be accomplished utilizing other methods that would result in polishing the textured surface to increase gloss of the textured surface.

As shown in FIG. 3A, after pre-treatment 303 of the surface of the metal structure, the surface of the metal structure may be anodized 304. Typically, the surface of the metal structure to be anodized 304 may be an outer or exposed metal surface of the metal structure. The outer or exposed surface typically may represent an exterior surface of the metal housing for the electronic device. Thereafter, surface characteristics of selected portions of an inner unanodized surface of the metal structure may be altered 306. The inner unanodized surface may be part of the metal layer that was anodized, or part of another layer that was not anodized. The surface characteristics may be altered 306 using a laser, such as an infrared wavelength laser (e.g., picosecond pulsewidth infrared laser or nanosecond pulsewidth infrared laser). For example, one specific suitable laser is a six (6) Watt infrared wavelength picosecond pulsewidth laser at 1000 KHz with a scan speed of 50 mm/sec. While such picosecond pulsewidth laser may provide many advantages, it may be more expensive than an alternative nanosecond pulsewidth laser. Accordingly, an example of a suitable alternative laser is a ten (10) Watt infrared wavelength nanosecond pulsewidth lasers at 40 KHz with a scan speed of 20 mm/sec.

Fluence of pulses of the laser may be selected so as to be approximately less than an ablation threshold fluence that characterizes the metal. More particularly, selection of the laser fluence may comprise selection of a peak laser fluence. Selection of the laser fluence may be for substantially avoiding ablation of the metal. Further, fluence of pulses of the laser may be selected so as to be greater than a damage fluence that characterizes the metal, so as to provide for altering surface characteristics of the selected portions of the inner unanodized surface of the metal structure.

Next, as shown in FIG. 3A, the anodized surface of the metal structure may be treated 308. The anodized surface of the metal structure may be porous. Accordingly, treating 308 the anodized surface may comprise sealing the anodized surface. Prior to such sealing, treating 308 the anodized surface may comprise dying the anodized surface. Further, treating 308 the anodized surface may comprise polishing the anodized surface. Polishing techniques discussed previously herein may be employed. Polishing 308 may polish any defects that may be in the anodized surface of the metal structure after the surface characteristics of selected portions of the inner unanodized surface of the metal structure are altered (as discussed previously herein with respect to altering 306.)

Dyeing may impart a rich color to the anodized surface. Since the anodized surface is porous in nature following anodization, the anodized surface may absorb a dye through its pores to impart the rich color to the anodized surface. The anodized surface may possess increased adherence capabilities for dyes, relative to metal. Beads of dye may flow into pores of the anodized surface, and adhere, so as to impart the color to the anodized surface. Dyeing may be accomplished through dipping or immersing the anodized surface into a dye solution containing a dye which will impart a desired color to the anodized surface. In some embodiments, the dye solution may be maintained at a temperature in a range between about 50 and 55 degrees Celsius. In some embodiments, the dye solution may contain a stabilizer to control the pH. Dyes that may be used may be selected so as to maintain a rich, vibrant color after polishing. Color control may be achieved by measuring the dyed anodized surface with a spectrophotometer and comparing the value against an established standard.

As mentioned previously, treating 308 the anodized surface may comprise sealing the anodized surface, so as to seal the pores of anodized surface. The sealing may include placing the anodized surface in a solution for a sufficient amount of time to create a sealant layer that seals the pores of the anodized surface. The sealing solution may include, but is not limited to, nickel acetate. The sealing solution may be kept at a temperature in a range between about 90 and 95 degrees Celsius. The anodized surface may be immersed in the solution for a period of at least 15 minutes. Following the treating 308 of the anodized surface of the metal structure, the marking process 300A shown in FIG. 3A can end.

FIG. 3B shows another embodiment 300B of the marking process, which is generally similar to what was just discussed in detail with respect to FIG. 3B, except that the other embodiment 300B shown in FIG. 3B includes an addition of polishing 305 the anodized surface, after anodizing 304 and prior to altering 306 the surface characteristics of selected portions of the inner unanodized surface of the metal structure. For the polishing 305 shown in FIG. 3B, polishing techniques may be used such as those discussed previously herein may with respect to FIG. 3A.

Figure 4A:
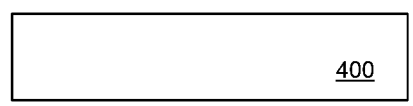
FIGS. 4A-4C are diagrams illustrating marking of a metal structure according to one embodiment.
Figure 4B:
Figure 4C:
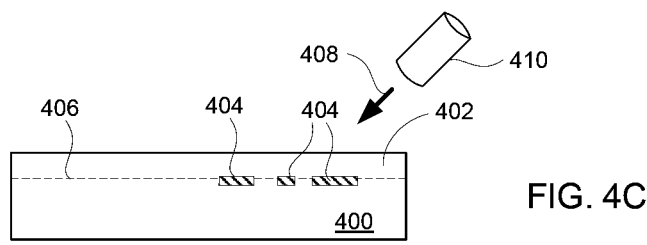

FIGS. 4A-4C are diagrams illustrating marking of a metal structure according to one embodiment. FIG. 4A illustrates a base metal structure 400. As an example, the base metal structure 400 can be formed of aluminum, titanium, niobium or tantalum. FIG. 4B illustrates the base metal structure 400 after an upper surface has been anodized to form an anodized surface 402. The thickness of the anodized surface 402 can, for example, be about 5-20 microns. After the anodized surface 402 has been formed on the base metal structure 400, FIG. 4C illustrates altered surfaces 404 being selectively formed on an inner unanodized surface 406. The altered structures 404 are formed by optical energy 408 produced by a laser 410 (e.g., infrared wavelength laser). The altered surfaces 404 combine to provide marking of the metal structure. For example, the altered surfaces 404 appear to be black and thus when selectively formed can provide marking. The resulting marking is visible through the anodized surface 402 which can be substantially translucent. If the anodized surface 402 is primarily clear, the resulting marking can be appear as black. The marking can also be provided in gray scale. If the anodized surface is dyed or colored, the markings may appear in different colors.

Fluence of the optical energy may be above the damage threshold fluence for the base metal structure, for forming the altered structures 404. However, notwithstanding the foregoing, it should be understood that fluence of the optical energy that forms the altered structures 404 on the altered surfaces of the base metal structure may be selected to be approximately below the ablation threshold fluence for the base metal structure, so as to avoid deleterious effects, for example, predominant ablative stripping of the anodized surface from the base metal structure. Further, predominant fracturing of the anodized surface, or predominant delaminating of the anodized surface from the base metal structure, may be substantially avoided by selectively limiting fluence of the optical energy that forms the altered structures. Fluence of the optical energy that forms the altered structures on the altered surfaces of the base metal structure may be selected so that non-ablative laser-material interactions such as heating, surface melting, surface vaporization and/or plasma formation predominate over any ablation. In other words, by exercising due care in selection of the fluence of the optical energy that forms the altered structures on the altered surfaces of the base metal structure; ablation, which may be characterized by direct evaporation the metal, in an explosive boiling that forms a mixture of energetic gases comprising atoms, molecules, ions and electrons, may not predominate over non-ablative laser-material interactions, such as heating, surface melting, surface vaporization and/or plasma formation.

The laser 410 may include a galvanometer mirror or other arrangement for raster scanning a spot of the optical energy over the inner unanodized surface 406, so as to form the altered structures into a rasterized depiction of the marking indicia. Suitable pitch between raster scan lines of the scanning spot may be selected. For example, a suitable pitch may be a fine pitch of about thirteen (13) microns. The laser may further include optics for contracting or expanding size of the spot of the optical energy, by focusing or defocusing the spot. Expanding size of the spot, by defocusing the spot may be used to select fluence of the optical energy. In particular, expanding size of the spot may select fluence of the optical energy to be approximately below the ablation threshold fluence for the base metal structure. Spot size of the optical energy for the nanosecond class laser mentioned previously herein may be within a range from approximately fifty (50) microns to approximately one hundred (100) microns; and spot size may be about seventy (70) microns.

FIG. 4D is a table illustrating exemplary laser operation parameters for marking the metal structure according to one embodiment. In particular, the table of FIG. 4D shows examples of various suitable laser models which may be used for marking the metal structure. The FOBA DP20GS is a Diode Pumped Solid State Neodymium-Doped Yttrium Orthovanadate (DPSS YVO4) type laser, which is available from FOBA Technology and Services GmbH, having offices at 159 Swanson Road, Boxborough, Mass. The SPI 12W/SM AND SPI 20W/SM are fiber type lasers, which are available from SPI Lasers UK, having offices at 4000 Burton Drive, Santa Clara, Calif. The Lumera is a picosecond type laser, which is available from LUMERA LASER GmbH, having an office at Opelstr 10, 67661 Kaiserslautern Germany. It should be understood that the table of FIG. 4D shows approximate exemplary laser operating parameters, and that various other laser operating parameters may be selected to provide the fluence of the optical energy that forms the altered structures of the base metal structure, wherein the fluence may be selected to be approximately below the ablation threshold fluence for the base metal structure.

Figure 4E:
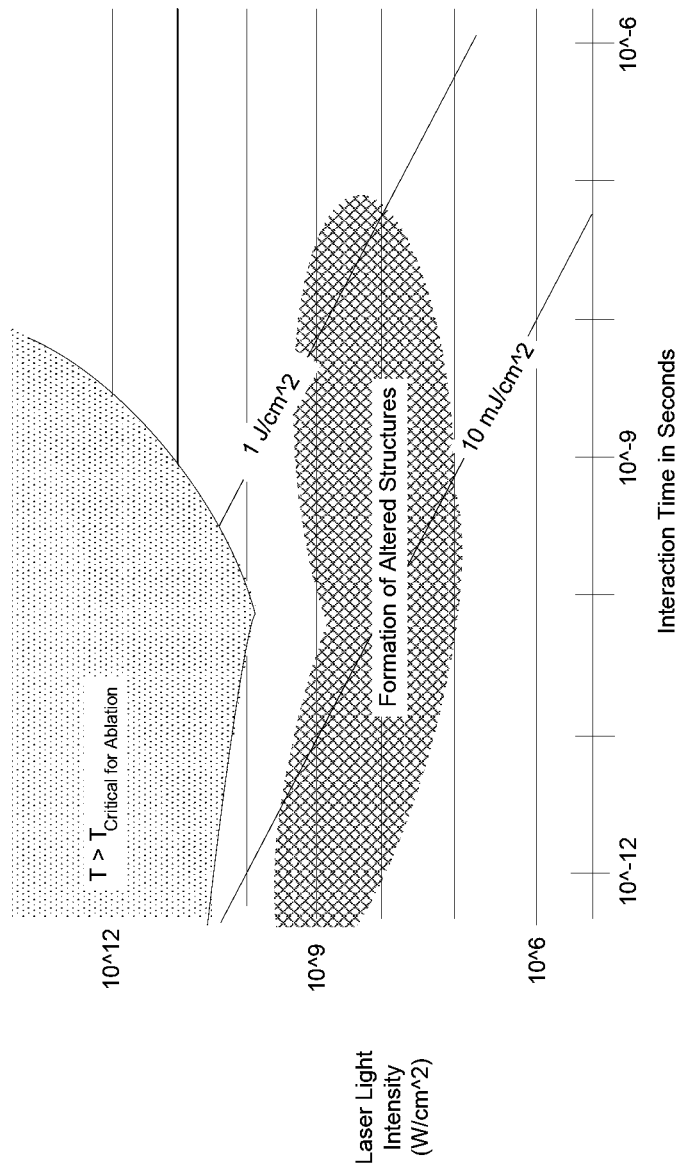
FIG. 4E is a diagram further illustrating exemplary laser operation parameters for marking the metal structure according to one embodiment.

FIG. 4E is a diagram further illustrating exemplary laser operation parameters for marking the metal structure according to one embodiment. In the diagram of FIG. 4E, irradiance of Laser Light Intensity in Watts per square centimeter is shown along a vertical axis, while Interaction Time of each pulse of the laser light (optical energy) with the metal structure is shown in fractions of a second along a horizontal axis. For illustrative reference purposes, diagonal lines of constant fluence of approximately ten (10) milli-Joules per square centimeter and of approximately one (1) Joule per square centimeter are shown in FIG. 4E. For substantially avoiding ablation of the metal structure, excessively high laser light intensity may be avoided, so that a temperature "T" of the metal structure may not substantially exceed a critical temperature for ablation of the metal structure. For example, a stippled region of exemplary excessively high laser light intensity is shown in FIG. 4E, along with a descriptive legend T>T critical for ablation. FIG. 4E further shows a cross hatched region of suggested approximate laser operation parameters, which may form of the altered structures.

Figure 4F:
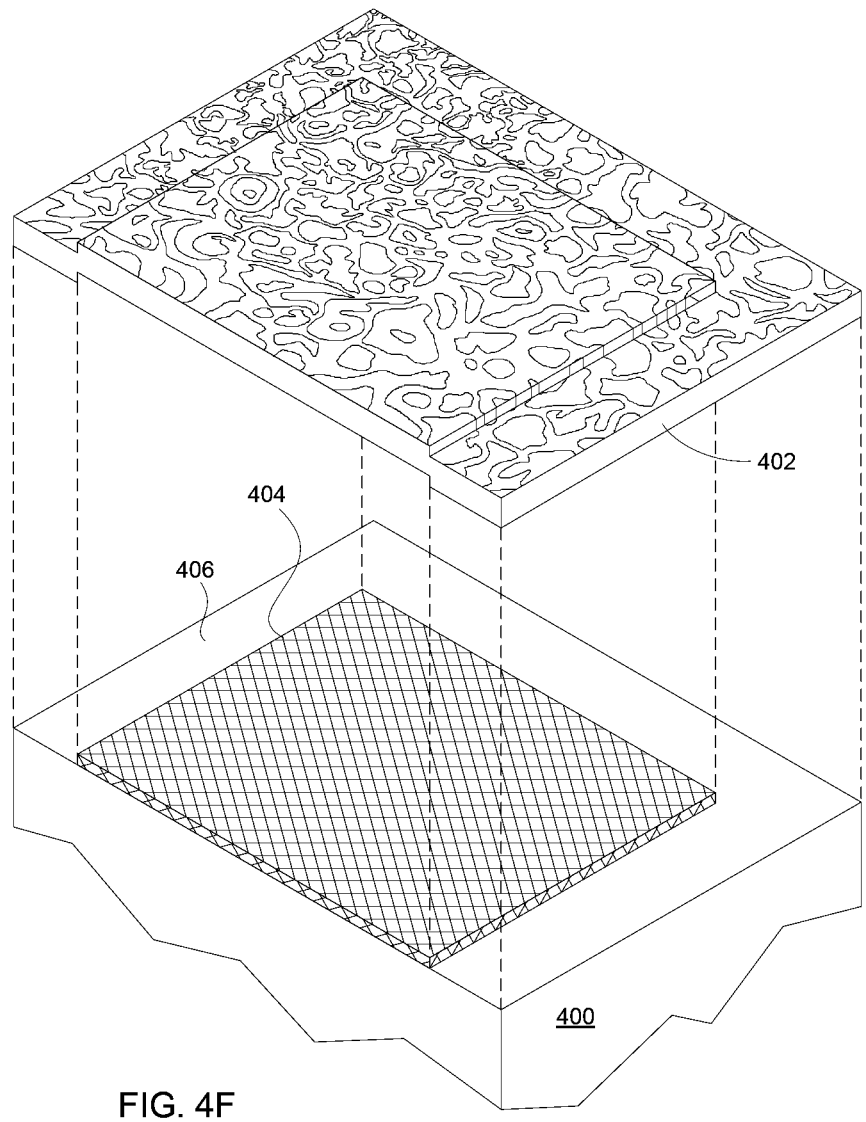
FIGS. 4F-4H are diagrams of various views representative of two-hundred times magnification photomicrographs of marking the metal structure according to one embodiment.
Figure 4G:
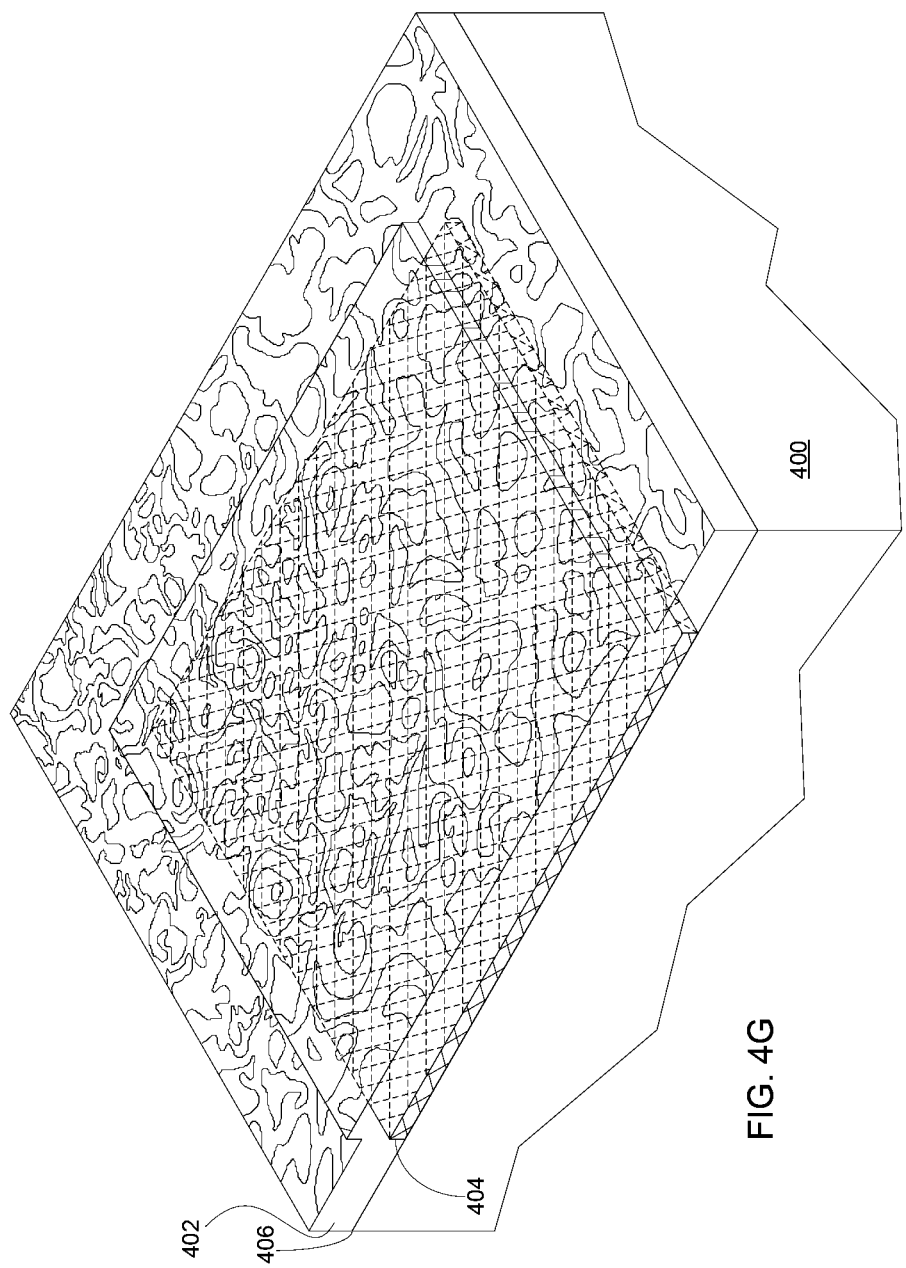
Figure 4H:
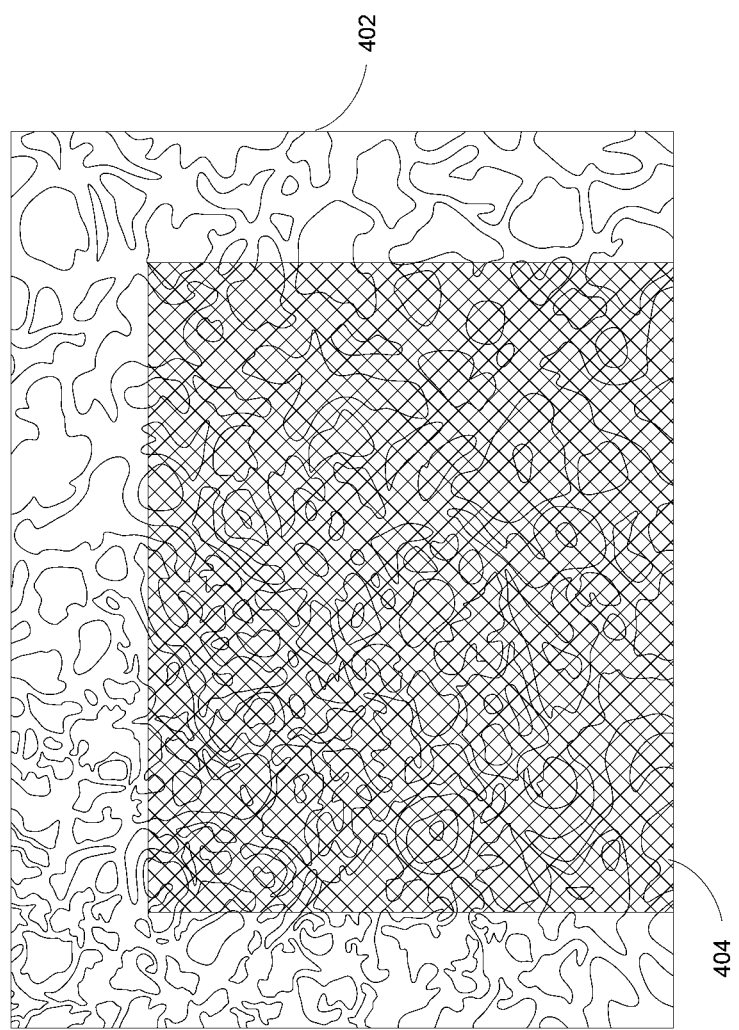

FIGS. 4F-4H are diagrams of various views representative of two-hundred times magnification photomicrographs of marking the metal structure according to one embodiment. In FIG. 4F, the anodized surface 402 is shown exploded away from the inner unanodized surface 406 of the base metal structure 400 in isometric view, so as to show clearly the altered structures 404 (which are particularly highlighted using cross hatching.) The anodized surface 402, the altered structures 404 and the inner unanodized surface 406 of the base metal structure 400 are shown in a collapsed isometric view in FIG. 4G, and in a top view in FIG. 4H. The anodized surface 402 may appear substantially optically transparent as shown in FIGS. 4F through 4H, however slight curved island surface features of the anodized surface 402 may be seen under the two-hundred times magnification. Further, FIGS. 4F through 4H show a stepped plateau feature of the anodized surface 402, which may be due to elevation by the altered structures 404, or may be due to an increase in volume contributed by the altered structures 404. A thickness of the stepped plateau feature may be slight, and may be about two to four microns. The foregoing slight curved island surface features and/or slight thickness of the stepped plateau feature of the anodized surface 402 may be substantially reduced and/or substantially eliminated by polishing, as discussed in detail elsewhere herein.

Figure 5:
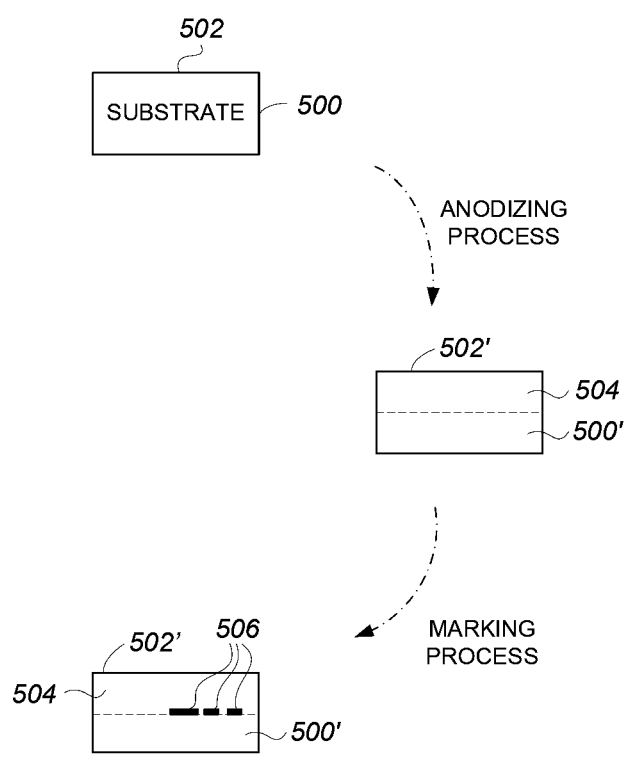
FIG. 5 is a flow diagram of a multi-stage marking process according to another embodiment.

FIG. 5 is a flow diagram of a multi-stage marking process 500 according to another embodiment. As shown in FIG. 5, a substrate 500 can be provided to an anodizing process that causes an anodized surface 504 to be formed on at least one surface of the substrate 500. The substrate 500 includes an exposed surface 502. The anodizing provided by the anodizing process serves to anodize the exposed surface 502. Once anodized, the exposed surface 502 is an anodized exposed surface 502'. After the substrate 500 has been anodized by the anodizing process, the anodized substrate 500' can be provided to a marking process. The marking process operates to produce altered surfaces 506 to the anodized substrate 500' below the anodized exposed surface 502'. The altered surfaces 506 provide the marking to the anodized substrate 500'. By controlling size, placement and/or darkness of the altered surfaces 506, the marking can be selectively provided to the anodized substrate 500'.

Figure 6:
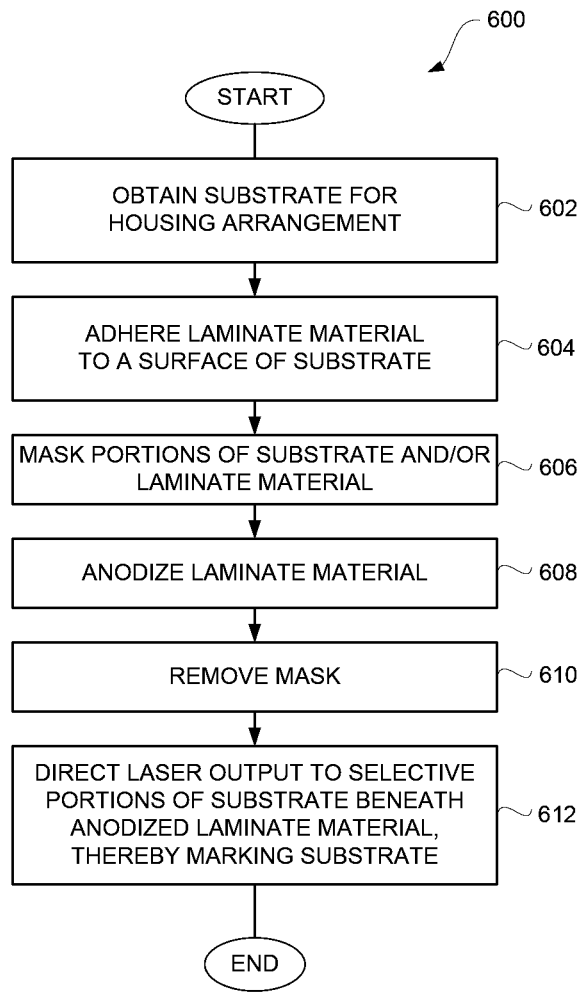
FIG. 6 is a flow diagram of a marking process according to one embodiment.

FIG. 6 is a flow diagram of a marking process 600 according to one embodiment. The marking process 600 can, for example, be performed by a marking system that serves to mark an electronic product. The marking process 600 can be performed on an electronic device that is to be marked. The marking process 600 is, for example, suitable for applying text or graphics to a housing (e.g., an outer housing surface) of the electronic device. The marking can be provided such that it is visible to a user of the electronic device. The marking can be placed in various different positions, surfaces or structures of the electronic device.

The marking process 600 can obtain 602 a substrate for a housing arrangement. Here, it is assumed that the electronic product to be marked includes a housing and that such housing is to be marked. After the substrate for the housing arrangement has been obtained 602, a laminate material can be adhered 604 to a surface of the substrate. In this embodiment, the laminate material is adhered 604 to the surface of the substrate to provide strength, cosmetic appeal, etc. For example, if the substrate is a metal, such as stainless steel, then the laminate layer can pertain to aluminum)or other material capable of being anodized).

Next, portions of the substrate can be masked 606. Here, since the substrate is going to undergo an anodization process, those portions of the substrate that are not to be anodized can be masked 606. Masking prevents an anodization to certain surfaces of the substrate or the laminate material adhered to the substrate. After portions of the substrate or laminate material are masked, the laminate material (that is not been masked off) can be anodized 608. Following the anodization, the mask can be removed 610.

Thereafter, laser output from a laser can be directed 612 to selected portions of the substrate beneath the anodized laminate material, thereby marking of the substrate. Consequently, the marking is provided by the altered regions that are below the surface. These altered regions can be induced by the laser output on the surface of the substrate below the laminate material. Following the block 612, the marking process 600 can end since the laser serves to produce altered regions below the outer surface of the laminate material.

Figure 7A:
FIGS. 7A-7D are diagrams illustrating marking of a metal structure according to one embodiment.
Figure 7B:
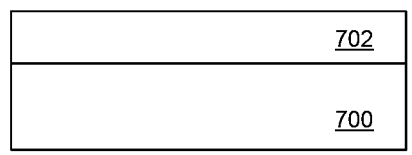
Figure 7C:
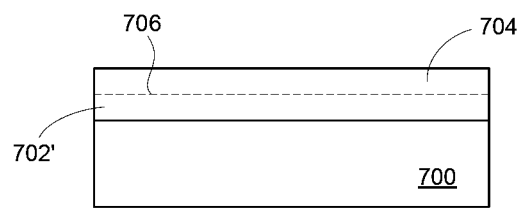
Figure 7D:
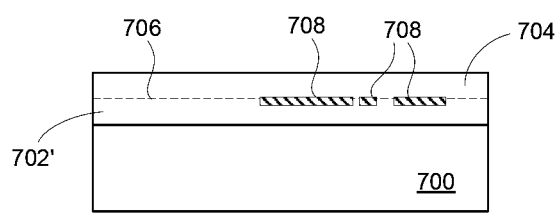

FIGS. 7A-7D are diagrams illustrating marking of a metal structure according to one embodiment. FIG. 7A illustrates a base metal layer 700. The base metal layer 700 can be a metal, such as stainless steel. FIG. 7B illustrates the base metal layer 700 after an outer metal layer 702 is provided on the base metal layer 700. The outer metal layer 702 can be a metal, such as aluminum, titanium, niobium or tantalum. FIG. 7C illustrates the metal structure 700 after the outer metal layer 702 has been anodized to form an anodized layer 704. After the anodized layer 704 has been formed, the outer metal layer 702 includes an outer portion representing the anodized layer 704 and an inner portion representing the unanodized portion of the outer metal layer 702. FIG. 7C also illustrated a representative boundary 706 between the outer portion and the inner portion of the anodized layer 704. Next, FIG. 7D illustrates altered surfaces 708 being selectively formed at the representative boundary 706. For example, the altered surfaces 708 can be formed on the unanodized portion of the outer metal layer 702. The altered structures 704 combine to provide marking of the metal structure. For example, the altered surfaces 708 appear to be black and thus when selectively formed can provide marking. The resulting marking is visible through the anodized surface 702 which can be substantially translucent. If the anodized surface 702 is primarily clear, the resulting marking can be appear as black. The marking can also be provided in gray scale. If the anodized surface is dyed or colored, the markings may appear in different colors.

Figure 8:
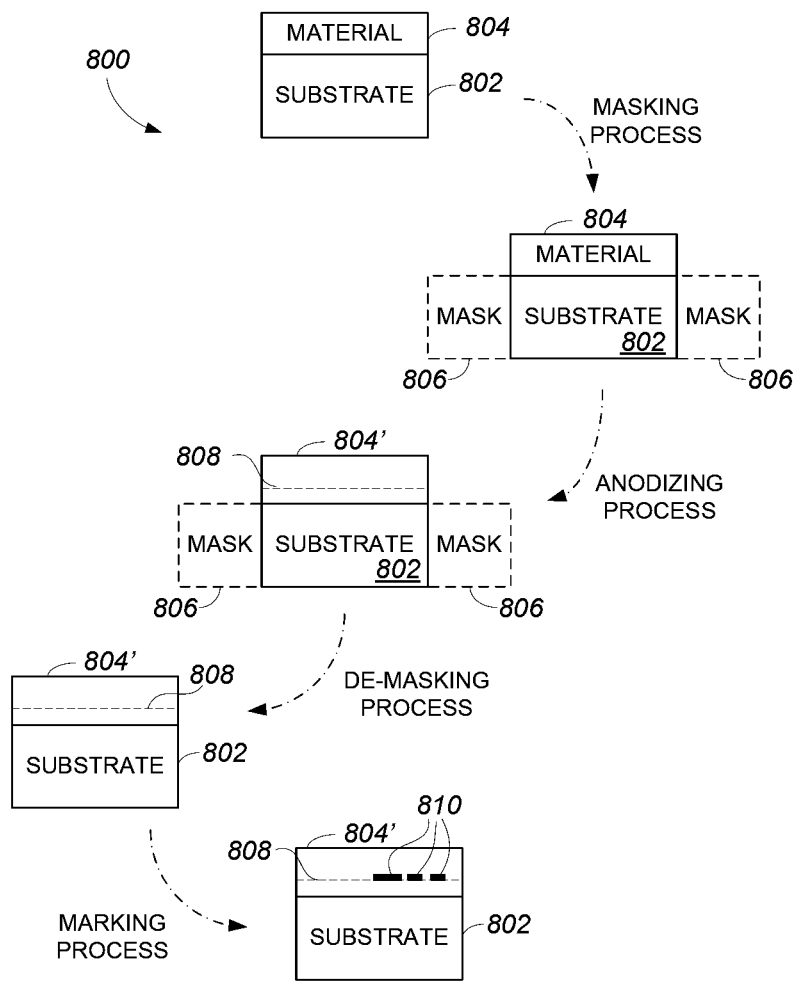
FIG. 8 is a flow diagram of a multi-stage marking process according to another embodiment.

FIG. 8 is a flow diagram of a multi-stage marking process 800 according to another embodiment. The marking process 800 can begin with a substrate 802 representing at least a portion of an article to be marked. As shown in FIG. 8, a substrate 802 can have a layer of material 804 adhered thereto. The layer of material 804 can generally formed from anodizable metals, i.e., metals which may be anodized. In one embodiment, the layer of material 804 can be aluminum, titanium, niobium or tantalum. The substrate 802 can be generally formed from non-anodizable metals, such as stainless steel.

The substrate 802 with the layer of material 804 can be provided to a masking process. At the masking process, portions of the substrate 802 can be "masked off" with mask material 806 that blocks anodization. The masking process generally does not mask off regions of the layer of material 804 but in some circumstances it may be desirable to do so.

After the masking has been completed at the masking process, the substrate 802 having the layer of material 804 and the mask 806 can be provided to an anodizing process. The anodizing process causes at least a portion of the layer of material 804 to be anodized. An anodized layer of material 804' is formed by the anodizing process. The anodized layer of material 804' is typically only anodized part way into the layer of material 804. A boundary 808 is established in the layer of material 804 between the anodized portion and the unanodized portion. The mask material 806 prevents anodization or damage to the substrate 802 during anodization.

Following anodization at the anodizing process, the substrate 802, the anodized layer of material 804' and the mask material 806 are provided to a de-masking process. At the de-masking process, the mask material 806 that was previously applied can now be removed since the anodization has been completed. Hence, following de-masking, the substrate 802 and the anodized layer of material 804' remain.

After the substrate 802 has been masked by the masking process, anodized by the anodizing process and de-masked by the de-masking process, the anodized substrate 802 with the anodized layer of material 804' can be provided to a marking process. At the marking process, the anodized layer of material 804' can be further processed to produce altered surfaces 810 at the boundary 808 in the anodized layer of material 804'. The altered surfaces 810 are thus below the surface of the anodized layer of material 804'. That is, in one embodiment, the altered surfaces 810 are induced into the unanodized portion of the layer of material 804' (i.e., portion below the boundary 808) as shown in FIG. 8. The altered surfaces 810 provide the marking to the layer of material 804. By controlling size, placement and/or darkness of the altered surfaces 810, the marking can be selectively provided to the article utilizing the substrate 802 and the anodized layer of material 804'. However, in an alternative embodiment, the altered surfaces 810 can be additionally or alternatively formed on the surface of the substrate 802 below the layer of material 804'.

The strength associated with stainless steel is generally desirable in the formation of housing walls for portable electronic devices including, but not limited to including, mobile phones (e.g., cell phones), portable digital assistants and digital media players. The stiffness associated with stainless steel is also desirable. However, the cosmetic properties of stainless steel are often lacking. To provide a cosmetic surface for a housing that effectively derives its strength from a stainless steel layer, an anodizable material may be clad to at least one surface of the stainless steel layer and then anodized. In one embodiment, a housing may include a stainless steel core that is substantially sandwiched between two layers of anodized material, e.g., anodized aluminum, which have a relatively high bond strength. The layers of anodized material effectively form cosmetic surfaces for the housing, while the stainless steel core provides structural strength, as well as stiffness, for the housing.

Figure 9:
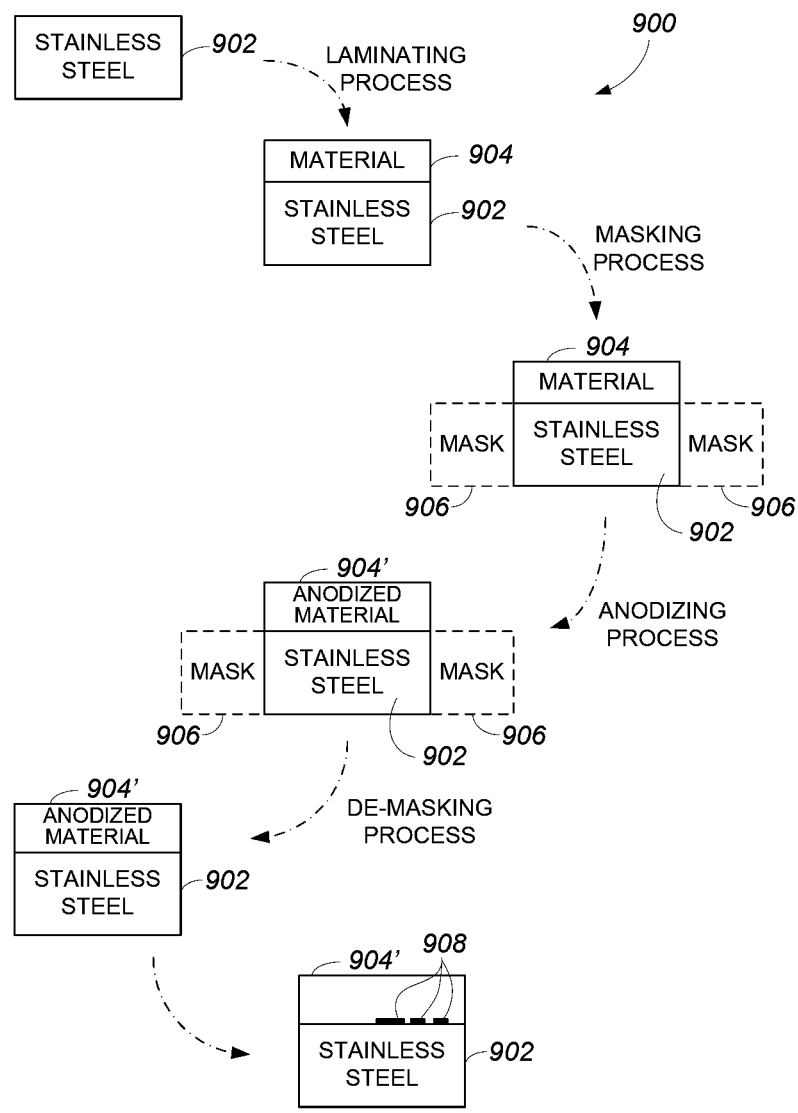
FIG. 9 is a flow diagram of a multi-stage marking process according to still another embodiment.

FIG. 9 is a flow diagram of a multi-stage marking process 900 according to still another embodiment. The marking process 900 can begin with a substrate 902 representing at least a portion of an article to be marked. In this embodiment, the substrate 902 is a layer of stainless steel. The substrate 902 can be can be provided to a laminating process. At the laminating process, the substrate 902 can have a layer of material 904 adhered thereto. The layer of material 904 can generally formed from anodizable metals, i.e., metals which may be anodized. In one embodiment, the layer of material 904 can be aluminum, titanium, niobium or tantalum. The layer of material 904 can be adhered to the substrate 904 by directly bonding the layer of material 904 to the substrate 902. For example, a cladding process can be used to bond the layer of material 904 to the substrate. As will be understood by those skilled in the art, a cladding is the bonding of metals substantially without an intermediate bonding agent and substantially without remelting the metals. Cladding may take a variety of different forms including, but not limited to including, standard cladding in which layer of material 904 and substrate 902 are pressed together with roller under high pressure, or fine cladding in which layer of material 904 and substrate 902 are placed in a vacuum and rolled together after a chemical process is performed.

Following the laminating process, the substrate 902 with the layer of material 904 can be provided to a masking process. At the masking process, portions of the substrate 902 can be "masked off" with mask material 906 that blocks anodization. The masking process generally does not mask off regions of the layer of material 904 but in some circumstances it may be desirable to do so.

After the masking has been completed at the masking process, the substrate 902 having the layer of material 904 and the mask 906 can be provided to an anodizing process. The anodizing process causes at least a portion of the layer of material 904 to be anodized. An anodized layer of material 904' is formed by the anodizing process. The anodized layer of material 904' may be anodized fully or part way into the layer of material 904. The mask material 906 prevents anodization or damage to the substrate 802 during anodization.

Following anodization at the anodizing process, the substrate 902, the anodized layer of material 904' and the mask material 906 are provided to a de-masking process. At the de-masking process, the mask material 806 that was previously applied can now be removed since the anodization has been completed. Hence, following de-masking, the substrate 902 and the anodized layer of material 904' remain.

After the substrate 902 has been masked by the masking process, anodized by the anodizing process and de-masked by the de-masking process, the anodized substrate 902 with the anodized layer of material 904' can be provided to a marking process. At the marking process, the anodized layer of material 904' can be further processed to produce altered surfaces 910 on the surface of the substrate 902 below the anodized layer of material 904'. The altered surfaces 910 are thus below the surface of the anodized layer of material 904'. That is, in one embodiment, the altered surfaces 910 are induced into the surface of the substrate 902 beneath at least the anodized portion of the layer of material 904'. The altered surfaces 910 provide the marking to the substrate 902. By controlling size, placement and/or darkness of the altered surfaces 910, the marking can be selectively provided to the article that uses the substrate 902.

Figure 10A:
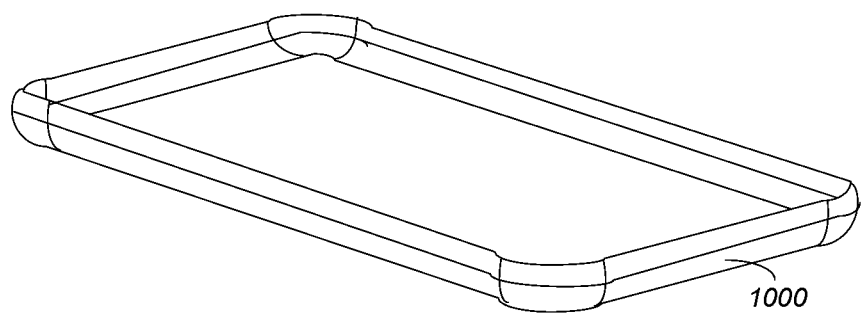
FIG. 10A is a diagrammatic representation of an exemplary housing 1000 on which a mask is to be placed.
Figure 10B:
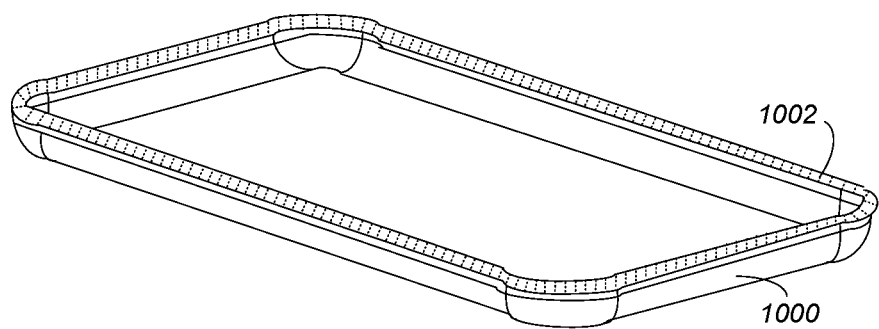
FIG. 10B is a diagrammatic representation of the same exemplary housing shown in FIG. 10A after a mask has been placed over an exposed stainless steel surface in accordance with one embodiment.

As described above, a substrate to be marked may included areas of exposed stainless steel, or areas in which stainless steel is not substantially covered by a laminant material. Such areas are generally masked prior to an anodizing process to protect the areas of exposed stainless steel from oxidizing or rusting. In one embodiment, an edge of a housing formed from a metal substrate having a laminant material may be masked with a masking material such that substantially only the laminant material, as for example aluminum, is exposed. FIG. 10A is a diagrammatic representation of an exemplary housing 1000 on which a mask is to be placed, and FIG. 10B is a diagrammatic representation of the same exemplary housing 1000 after a mask 1002 has been placed over an exposed stainless steel surface in accordance with an embodiment. The housing 1000 may be a housing that is to be a part of an overall assembly, as for example a bottom of a cell phone assembly or portable media player. As shown in FIG. 10B, the mask 1002 is applied to a top edge of the housing 1000.

Figure 11:
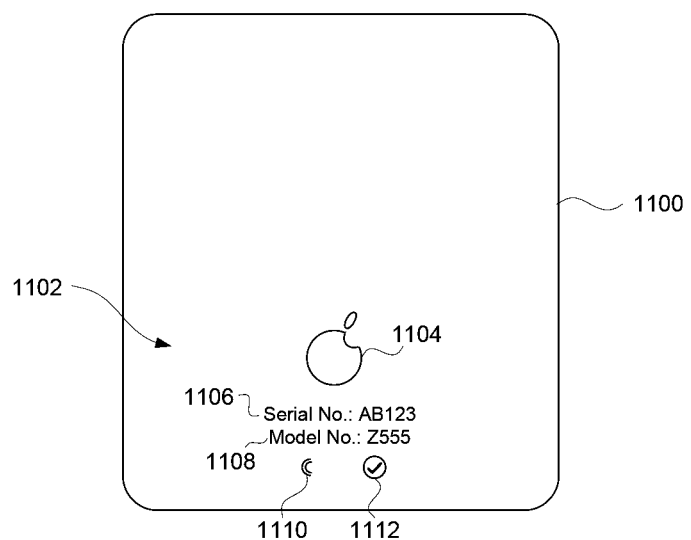
FIG. 11 illustrates the product housing having markings according to one exemplary embodiment.

FIG. 11 illustrates the product housing 1100 having markings 1102 according to one exemplary embodiment. The markings 1102 can be produced on a sub-surface of the product housing 1100 in accordance with any of the embodiment discussed above. In this example, the labeling includes a logo graphic 1104, serial number 1106, model number 1108, and certification/approval marks 1110 and 1112.

The marking processes described herein are, for example, suitable for applying text or graphics to a housing surface (e.g., an outer housing surface) of an electronic device. The marking processes are, in one embodiment, particularly well-suited for applying text and/or graphics to an outer housing surface of a portable electronic device. Examples of portable electronic devices include mobile telephones (e.g., cell phones), Personal Digital Assistants (PDAs), portable media players, remote controllers, pointing devices (e.g., computer mouse), game controllers, etc. The portable electronic device can further be a hand-held electronic device. The term hand-held generally means that the electronic device has a form factor that is small enough to be comfortably held in one hand. A hand-held electronic device may be directed at one-handed operation or two-handed operation. In one-handed operation, a single hand is used to both support the device as well as to perform operations with the user interface during use. In two-handed operation, one hand is used to support the device while the other hand performs operations with a user interface during use or alternatively both hands support the device as well as perform operations during use. In some cases, the hand-held electronic device is sized for placement into a pocket of the user. By being pocket-sized, the user does not have to directly carry the device and therefore the device can be taken almost anywhere the user travels (e.g., the user is not limited by carrying a large, bulky and often heavy device).

Additional information on product marking as well as other manufacturing techniques and systems for electronic devices are contained in U.S. Provisional Patent Application No. 61/059,789, filed Jun. 8, 2008, and entitled "Methods and Systems for Manufacturing an Electronic Device," which is hereby incorporated herein by reference.

This application is also references: (i) U.S. Provisional Patent Application No. 61/121,491, filed Dec. 10, 2008, and entitled "Techniques for Marking Product Housings," which is hereby incorporated herein by reference; (ii) U.S. patent application Ser. No. 12/358,647, filed Jan. 23, 2009, and entitled "Method and Apparatus for Forming a Layered Metal Structure with an Anodized Surface," which is hereby incorporated herein by reference; and (iii) U.S. patent application Ser. No. 12/475,597, filed May 31, 2009, and entitled "Techniques for Marking Product Housings," which is hereby incorporated herein by reference.

The various aspects, features, embodiments or implementations of the invention described above can be used alone or in various combinations.

Different aspects, embodiments or implementations may, but need not, yield one or more of the following advantages. One advantage of the invention is that durable, high precision markings can be provided to product housings. As an example, the markings being provided on a sub-surface of a product housing that not only have high resolution and durability but also provide a smooth and high quality appearance. Another advantage is that the marking techniques are effective for surfaces that are flat or curved.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. An electronic device housing, comprising:
a housing structure comprising:
an outer polished portion formed from an anodized metal;
an inner portion formed from non-anodized metal that is different than the anodized metal; wherein
selectively altered surface regions are formed within the inner portion on a surface that is closest to the outer polished portion; and the altered surface regions provide predetermined marking of the electronic device housing.

2. The electronic device housing as recited in claim 1, wherein the altered surface regions are formed on the surface of the inner portion after the outer polished portion has been anodized without noticeable disturbance to the anodized outer portion.

3. The electronic device housing as recited in claim 1, wherein the altered surface regions on the surface of the inner portion are altered through the outer polished portion that is anodized.

4. The electronic device as recited in claim 3, wherein the altered surface regions are formed on the surface of the inner portion by a laser output through the outer polished portion that has been anodized.

5. The electronic device as recited in claim 4, wherein the laser is a nanosecond pulsewidth infrared laser.

6. The electronic device as recited in claim 1, wherein the altered surface regions cause one or more textual or graphical indicia to appear on the housing structure.

7. The electronic device as recited in claim 1, wherein at least the outer polished portion of the housing structure comprises aluminum.

8. The electronic device as recited in claim 1, wherein the outer polished portion of the housing structure comprises aluminum, and wherein the inner portion of the housing structure comprises stainless steel.

9. The electronic device as recited in claim 1, wherein the altered surface regions are formed by a laser output directed through the outer polished portion towards the inner portion.

10. An electronic device as recited in claim 9, wherein the laser is a nanosecond pulsewidth infrared laser.

11. The electronic device as recited in claim 9, wherein:
the inner portion is characterized by an ablation threshold fluence; and
the laser has a fluence that is approximately less than the ablation threshold fluence of the metal, so that ablation of the metal is substantially avoided.

12. The electronic device as recited in claim 9, wherein:
the metal is characterized by a damage threshold fluence; and
the laser has a fluence that is greater than the damage threshold fluence of the inner portion, such that surface characteristics of the selective portions of the inner portion of the housing structure are altered.

13. A housing arrangement comprising:
a base metal layer comprising stainless steel;
an additional layer comprising aluminum, the additional layer having a first bonding surface and a first exterior surface, the first bonding surface being bonded in direct contact with a first surface of the base metal layer, the first exterior surface being a polished exterior of the housing arrangement; and
sub-surface marking indicia formed on the first surface of the base metal layer.

14. The housing arrangement as recited in claim 13, wherein the first exterior surface is anodized prior to forming the sub-surface marking indicia.

15. The housing arrangement as recited in claim 13, wherein the sub-surface marking indicia provide predetermined marking of the housing arrangement.

16. The housing arrangement as recited in claim 13, wherein the sub-surface marking indicia comprise one or more textual or graphical indicia.

17. The housing arrangement as recited in claim 13, wherein the sub-surface marking indicia are formed by directing a laser output through the additional layer to the first surface of the base metal layer.

* * * * *